(12) United States Patent
Kadota

(10) Patent No.: US 9,172,826 B2
(45) Date of Patent: Oct. 27, 2015

(54) PROCESSING APPARATUS, TERMINAL APPARATUS, AND CONTROL METHODS THEREFOR

(71) Applicant: CANON KABUSHIKI KAISHA, Tokyo (JP)

(72) Inventor: Eiji Kadota, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/337,778

(22) Filed: Jul. 22, 2014

(65) Prior Publication Data

US 2015/0036166 A1  Feb. 5, 2015

(30) Foreign Application Priority Data

Jul. 31, 2013 (JP) ................................ 2013-159715

(51) Int. Cl.
*H04N 1/00* (2006.01)
*G06Q 20/14* (2012.01)
*G06Q 20/26* (2012.01)

(52) U.S. Cl.
CPC ........... *H04N 1/0009* (2013.01); *G06Q 20/145* (2013.01); *G06Q 20/26* (2013.01); *H04N 1/00244* (2013.01); *H04N 1/00302* (2013.01); *H04N 1/00899* (2013.01); *H04N 2201/006* (2013.01); *H04N 2201/0094* (2013.01); *H04N 2201/0096* (2013.01)

(58) Field of Classification Search
USPC ......................................... 359/1.15; 358/1.15
See application file for complete search history.

(56) References Cited

U.S. PATENT DOCUMENTS

| | | | |
|---|---|---|---|
| 2012/0188601 A1* | 7/2012 | Kutsuwada et al. | 358/1.15 |
| 2013/0229673 A1* | 9/2013 | Nakayama et al. | 358/1.13 |
| 2013/0229683 A1* | 9/2013 | Nakayama | 358/1.15 |
| 2013/0231051 A1* | 9/2013 | Naruse | 455/41.2 |

FOREIGN PATENT DOCUMENTS

JP  2010-6016 A  1/2010

* cited by examiner

*Primary Examiner* — Ngon Nguyen
(74) *Attorney, Agent, or Firm* — Fitzpatrick, Cella, Harper & Scinto

(57) ABSTRACT

This invention provides a technique in which even if a job by a processing apparatus is interrupted during execution, another apparatus continues the processing using completely the same function without further billing the user. Upon receiving a print job, a printing apparatus executes billing processing for the job, in which the printing apparatus communicates with a billing server. The printing apparatus writes, in the memory of an NFC unit, setting values about the received print job, the identification information of the printing apparatus itself, and the identification information of another alternative processing apparatus. While executing the print job, the printing apparatus writes progress information about an unprocessed portion of the job in the memory of the NFC unit every time a preset processing unit is executed during execution of the job.

19 Claims, 15 Drawing Sheets

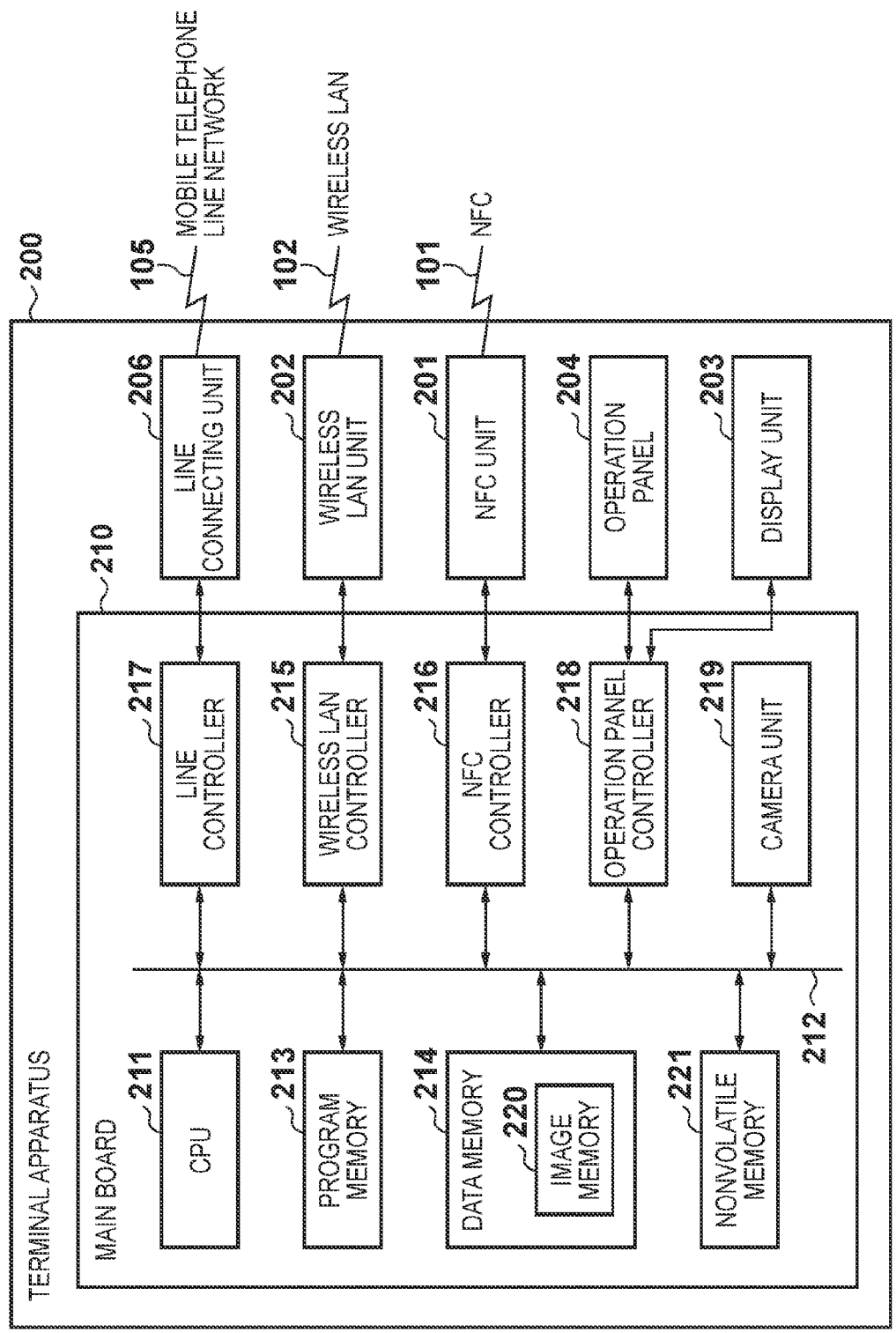

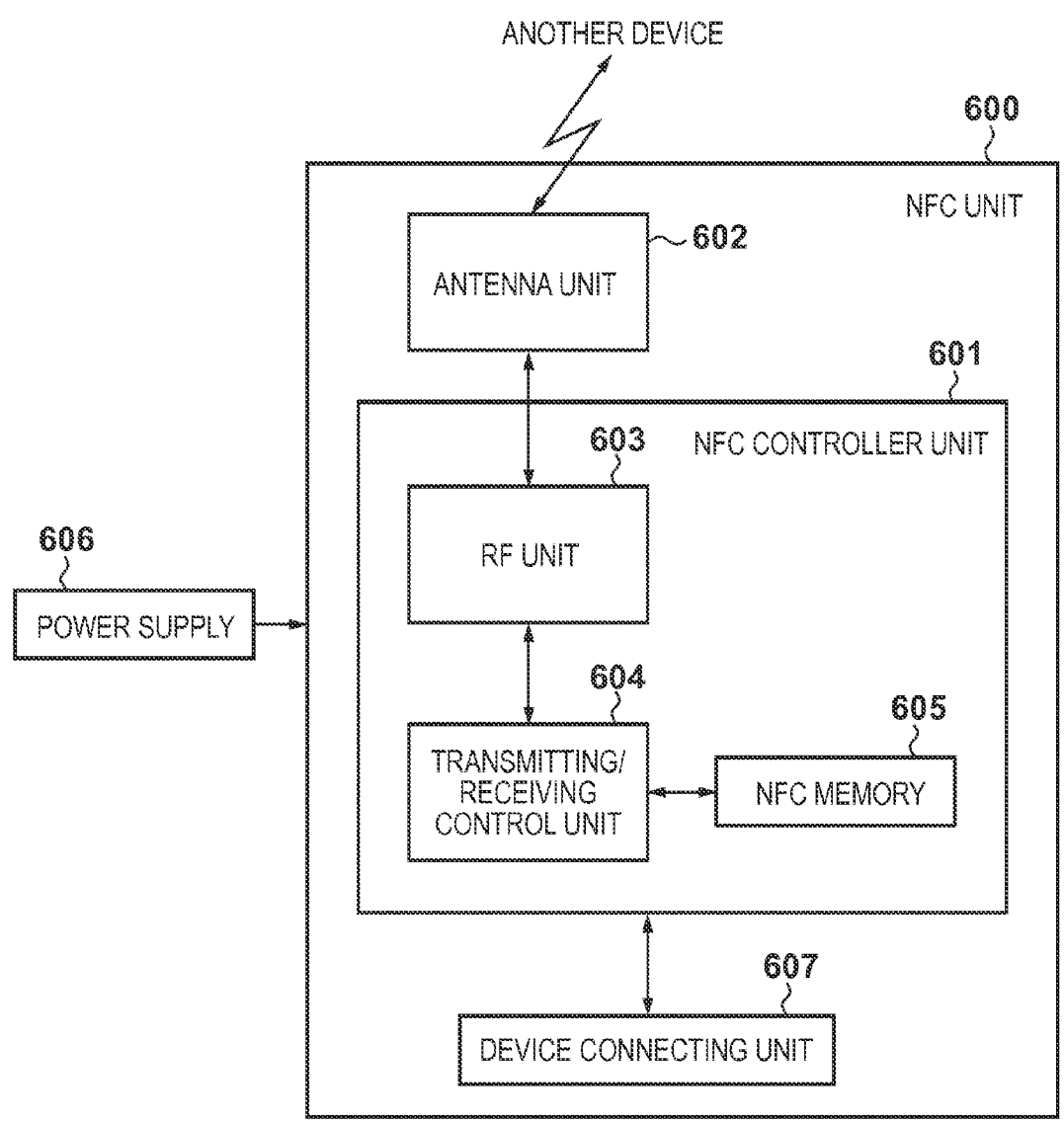

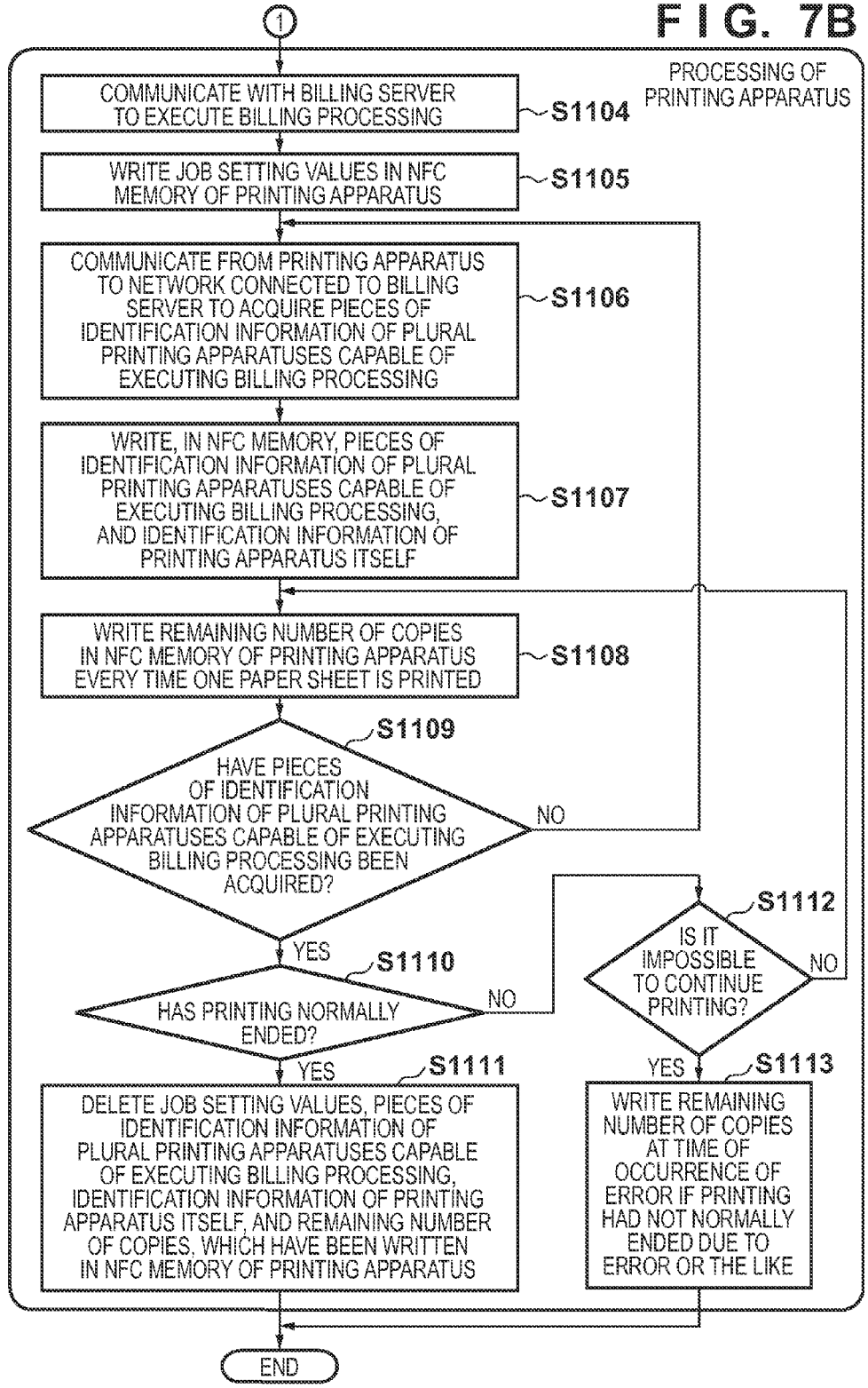

FIG. 8

| PAPER SIZE |
| --- |
| MARGIN (SPACE) |
| PAPER TYPE |
| DOUBLE-SIDED SETTING (SHORT SIDE/LONG SIDE/ETC.) |
| QUALITY |
| ... |
| ... |

FIG. 9

| APPARATUS ID | COMMUNICATION APPARATUS IDENTIFIER (IP ADDRESS) |
| --- | --- |
| 0001 | 200. 200. 200. 1 |
| 0002 | 200. 200. 200. 2 |
| 0003 | 200. 200. 200. 3 |
| 0004 | 200. 200. 100. 1 |
| 0005 | 200. 200. 100. 2 |
| ... | ... |

FIG. 10

| APPARATUS ID OF PRINTING APPARATUS ITSELF | COMMUNICATION APPARATUS IDENTIFIER (IP ADDRESS) |
| --- | --- |
| 0005 | 200. 200. 100. 2 |

F I G. 11

| IMAGE ID | REMAINING NUMBER OF COPIES |
|---|---|
| 1 | 10 |
| 2 | 5 |
| 3 | 4 |
| 4 | 3 |
| 5 | 20 |
| ... | ... |

PROCESSING APPARATUS, TERMINAL APPARATUS, AND CONTROL METHODS THEREFOR

BACKGROUND OF THE INVENTION

1. Field of the Invention

The present invention relates to a technique of processing a job using short distance wireless communication.

2. Description of the Related Art

In recent years, there is known a system in which an external apparatus such as a digital camera or mobile phone specifies a communication partner by short distance wireless communication represented by NFC, and an image forming apparatus such as a printer outputs an image file by wireless communication different from short distance wireless communication.

Since the external apparatus disconnects communication upon completion of transfer of an image file, even if an error occurs in the image forming apparatus after completion of transfer of the image file, the external apparatus is never notified of contents of the error. It is, therefore, difficult for the user of the external apparatus to recognize what kind of error has occurred, and an operation required for dealing with the error. To solve such problem, Japanese Patent Laid-Open No. 2010-6016 discloses a method of notifying an external apparatus of information about an error which has occurred, at the time of reconnection after disconnection of wireless communication.

In, however, an example described in Japanese Patent Laid-Open No. 2010-6016, even if an external apparatus is notified that an error has occurred, it is impossible to grasp settings used in printing in which the error has occurred and the progress status of printing. Therefore, for example, if the user attempts to cause a printing apparatus different from the printing apparatus in which the error has occurred to continue the remaining part of the printing operation in the same settings, the user needs to make settings again, and designate a page or the like from which printing is to be continued. It is thus difficult for another printer to continue the printing operation.

SUMMARY OF THE INVENTION

To solve this problem, for example, the present invention in an aspect provides a processing apparatus for executing a job, comprising a receiving unit configured to receive a job from an external apparatus; an execution unit configured to execute processing corresponding to the job received by the receiving unit; and a control unit configured to write, in a memory which is accessible by the external apparatus even when no power is supplied to the processing apparatus, at least one of a setting value about the job and progress information of the processing executed by the execution unit of the job.

According to the present invention, even if a job by a processing apparatus is interrupted during execution, another apparatus can continue the processing using completely the same function without further billing the user.

Further features of the present invention will become apparent from the following description of exemplary embodiments (with reference to the attached drawings).

BRIEF DESCRIPTION OF THE DRAWINGS

FIG. 4 is a block diagram showing the arrangement of the terminal apparatus;

FIG. 6 is a block diagram showing the arrangement of an NFC unit;

FIGS. 7A and 7B are flowcharts illustrating processing contents according to the first embodiment;

FIG. 8 is a table showing job setting values saved in the NFC memory of the printing apparatus;

FIG. 9 is a table showing the pieces of identification information of printing apparatuses saved in the NFC memory of the printing apparatus;

FIG. 10 is a table showing the identification information of the printing apparatus saved in the NFC memory of the printing apparatus;

FIG. 11 is a table showing the remaining number of copies saved in the NFC memory of the printing apparatus;

DESCRIPTION OF THE EMBODIMENTS

Preferred embodiments of the present invention will be exemplarily described in detail below with reference to the accompanying drawings. Note that the relative arrangement of components, display screens, and the like set forth in the embodiments do not intend to limit the scope of the invention to them, unless otherwise specified.

[First Embodiment]

Figure 1:
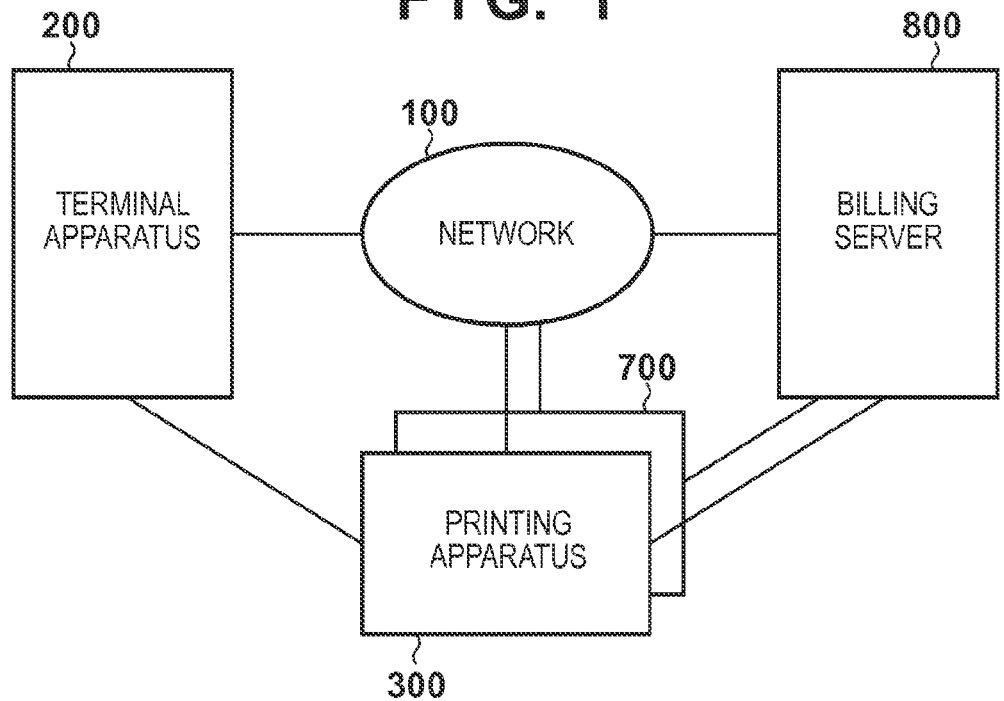
FIG. 1 is a view showing the configuration of a printing system according to an embodiment.

FIG. 1 is a view showing the configuration of a print processing system. This system includes a portable terminal apparatus 200, printing apparatuses 300 and 700, and a billing server 800, which are connectable to a network 100 centered on it. The terminal apparatus 200 functioning as a communication apparatus includes at least two or more wireless communication units whose communication speeds are different from each other. The terminal apparatus 200 may be any apparatus which can process a file to be printed, for example, a personal information terminal such as a PDA (Personal Digital Assistant), a mobile phone, or a digital camera.

The printing apparatus 300 (the same applies to the printing apparatus 700) which also functions as a communication apparatus has a reading function of reading an original placed on an original table, and a printing function of performing printing using a print engine such as an inkjet printer, and may additionally have a FAX function and telephone function. Note that FIG. 1 shows a case in which the two printing apparatuses 300 and 700 are connected to the network. However, the number of printing apparatuses is not limited to this, and a plurality of printing apparatuses need only be connected to the network.

The billing server 800 has a function of executing billing processing in response to a request from the printing apparatus 300, and the printing apparatus 300 is connected by a wired or wireless LAN. Furthermore, a plurality of printing apparatuses may be connected to the billing server 800.

The network 100 and the printing apparatus 300 are connected by a wired or wireless LAN. The network 100 and the terminal apparatus 200 are connected by a wireless LAN. Since the terminal apparatus 200 and the printing apparatus 300 have a wireless LAN function, they can perform peer-to-peer (to be referred to as P2P hereinafter) communication by executing mutual authentication.

Figure 2:
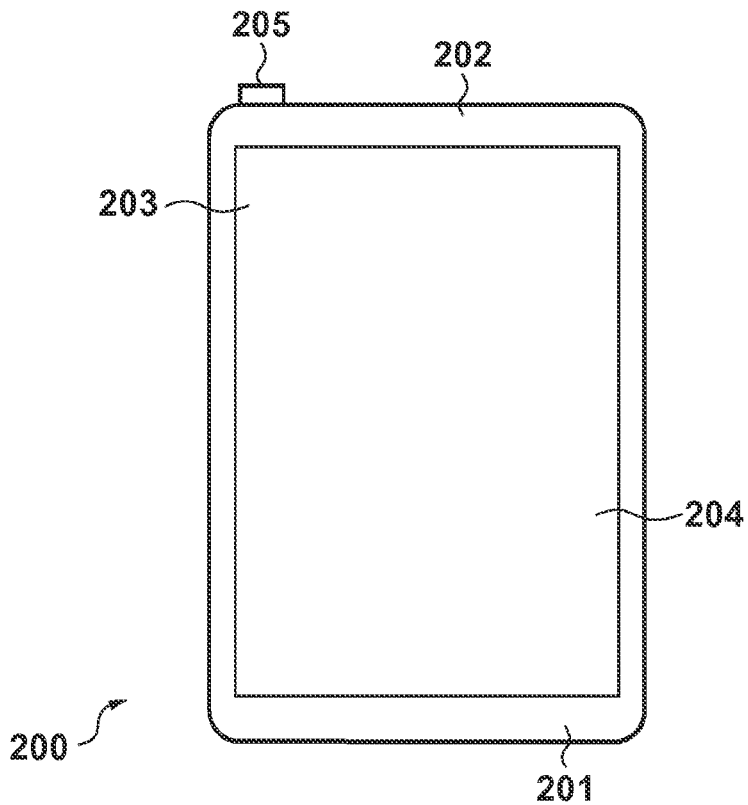
FIG. 2 is a view showing the outer appearance of a terminal apparatus.

FIG. 2 is a view showing the outer appearance of the terminal apparatus 200. In this embodiment, a smartphone will be exemplified. The smartphone indicates a multi-function mobile phone which incorporates a camera, network browser, email function, and the like in addition to functions of a mobile phone. An NFC (Near Field Communication) unit 201 is a unit used to perform short distance wireless communication. When the NFC unit 201 is actually moved closer to a partner NFC unit (the NFC unit of the printing apparatus 300 in this embodiment) within a predetermined distance (about 10 cm), they can communicate with each other.

A wireless LAN unit 202 is a unit used to perform communication via a wireless LAN, and is arranged within the terminal apparatus 200. A display unit 203 is, for example, a display having an LCD display mechanism. An operation panel 204 includes a touch-panel operation mechanism, and detects pressing information of the user. As a representative operation method, the display unit 203 displays button icons and a software keyboard, and the user presses the operation panel 204, thus issuing a button pressing event. A power key 205 is used to turn on/off the power.

Figure 3A:
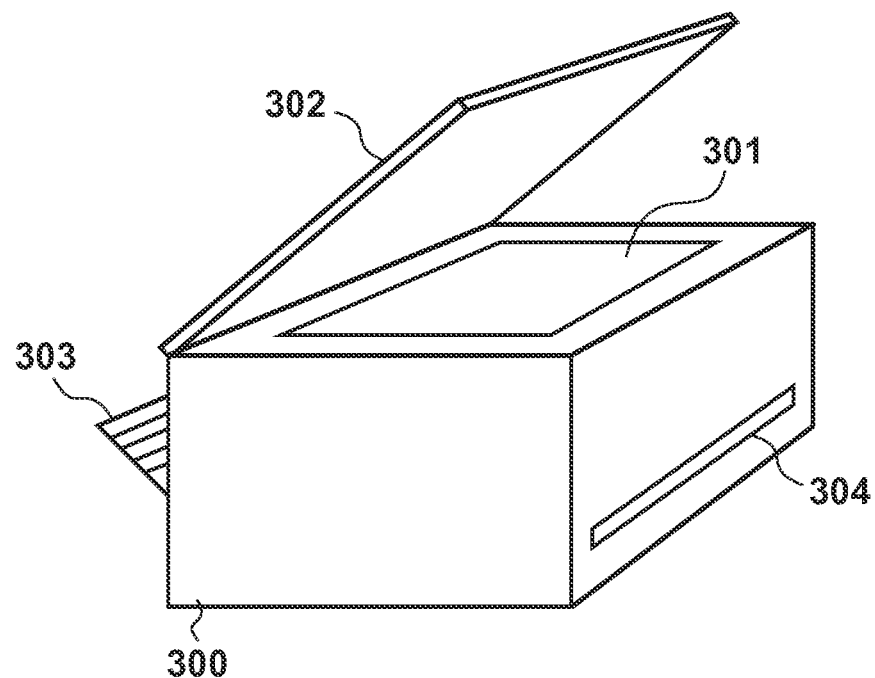
FIGS. 3A and 3B are a perspective view and plan view, respectively, showing the outer appearance of a printing apparatus.

FIG. 3A is a perspective view showing the outer appearance of the printing apparatus 300. In this embodiment, an MFP (Multi Function Printer) having a reading function (scanner) will be exemplified. Referring to FIG. 3A, an original table 301 is a glass-like transparent table which is used to read an original placed on it by the scanner. An original cover 302 is a cover used to prevent reading light from externally leaking at the time of reading by the scanner. A printing paper insertion port 303 is an insertion port on which paper sheets of various sizes are set. Paper sheets set on the printing paper insertion port 303 are conveyed one by one to a printing unit, and are discharged from a printing paper discharge port 304 after printing is performed.

Figure 3B:
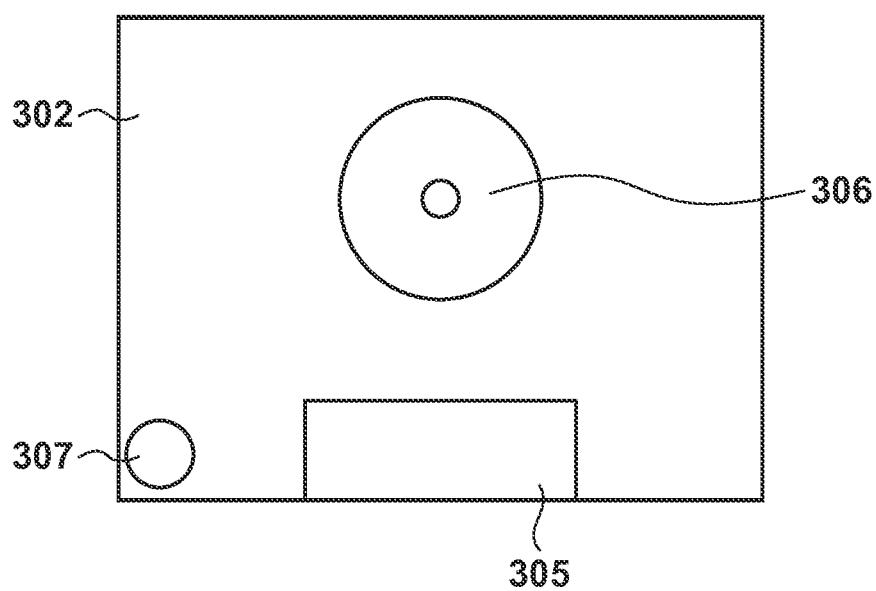

Referring to FIG. 3B, an operation panel 305 and an NFC unit 306 are arranged on the upper portion of the original cover 302. The NFC unit 306 is a unit used to perform short distance wireless communication, and is a place where the terminal apparatus 200 is actually moved closer to the printing apparatus 300. A predetermined distance (about 10 cm) from the NFC unit 306 is an effective distance of contact. A wireless LAN antenna 307 is an antenna which is used to perform wireless LAN communication, and is embedded in the MFP.

Note that short distance wireless communication indicates wireless communication whose communication range is a relatively narrow predetermined range (for example, 1 m to several cm), which is represented by NFC.

FIG. 4 is a block diagram showing the arrangement of the terminal apparatus 200. The terminal apparatus 200 includes a main board 210 for controlling the overall apparatus, the wireless LAN unit 202, the NFC unit 201, a line connecting unit 206, the operation panel 204, and the display unit 203. Note that each of the wireless LAN unit 202, NFC unit 201, line connecting unit 206 functions as a communication unit of the terminal apparatus 200.

A CPU 211 in the form of a microprocessor arranged in the main board 210 operates according to control programs stored in a program memory 213 in the form of a ROM connected via an internal bus 212, and contents in a data memory 214 in the form of a RAM.

By controlling the wireless LAN unit 202 via a wireless LAN controller 215, the CPU 211 communicates with another communication terminal apparatus via a wireless LAN 102. By controlling the NFC unit 201 via an NFC controller 216, the CPU 211 can detect a connection with another NFC terminal via NFC 101, and transmit/receive data to/from the other NFC terminal. By controlling the line connecting unit 206 via a line controller 217, the CPU 211 can connect to a mobile telephone line network 105, and make a call or transmit/receive data.

By controlling an operation panel controller 218, the CPU 211 can detect a user operation through the operation panel 204, and display data on the display unit 203. The CPU 211 can capture an image by controlling a camera unit 219, and store the captured image in an image memory 220 of the data memory 214. In addition to the captured image, it is possible to store, in the image memory 220, an image acquired from the outside via the mobile telephone line network 105, wireless LAN 102, or NFC 101, and also transmit an image to the outside.

A nonvolatile memory 221 is implemented by a memory such as a flash memory, and stores data to be saved even after power-off. The nonvolatile memory 221 stores, for example, image data to be saved, and programs such as application software programs for implementing various functions of the terminal apparatus 200, in addition to address book data, various kinds of communication connection information, previously connected device information, and the like.

Figure 5:
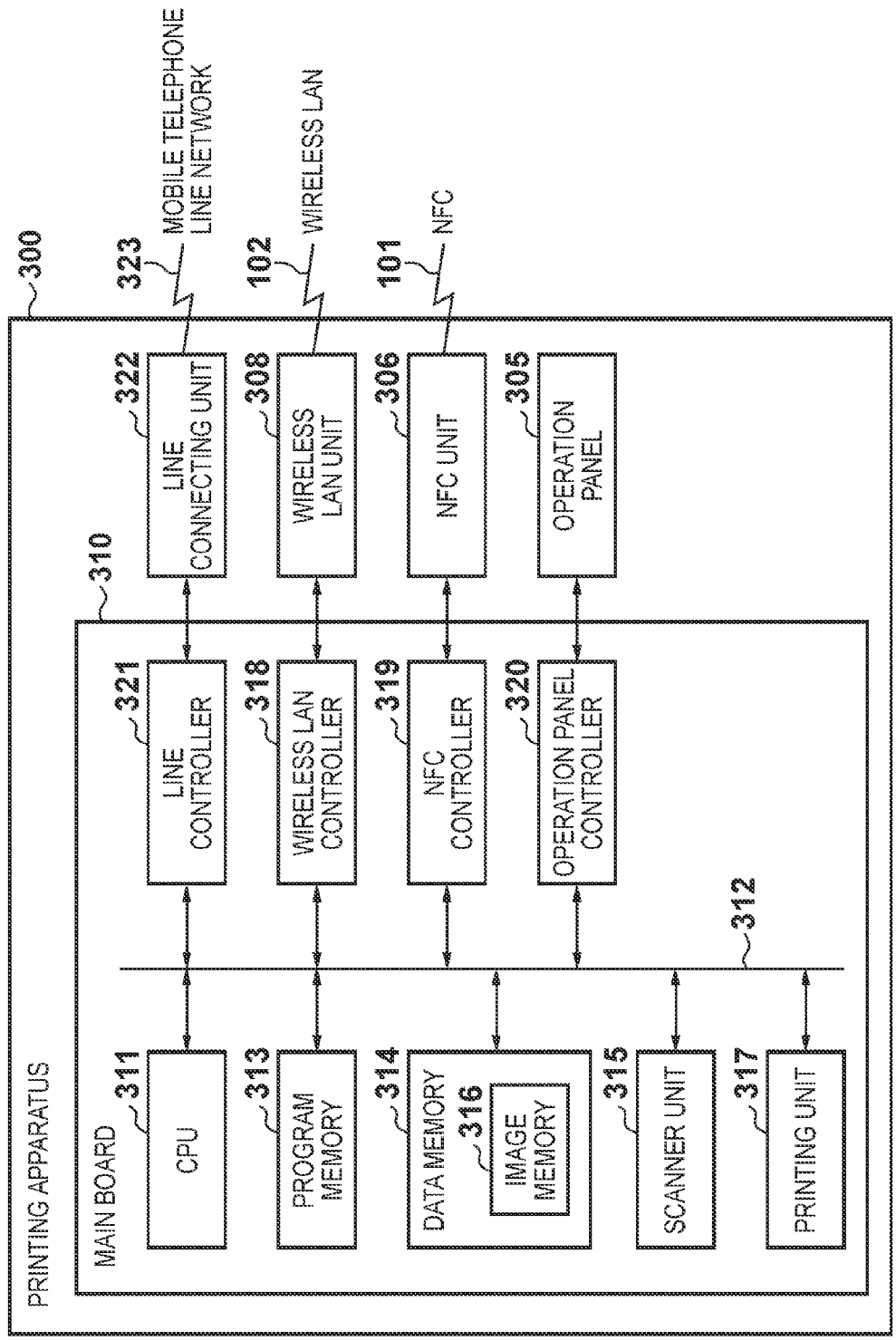
FIG. 5 is a block diagram showing the arrangement of the printing apparatus.

FIG. 5 is a block diagram showing the arrangement of the printing apparatus 300. Note that the printing apparatus 700 has the same arrangement and a description thereof will be omitted. The printing apparatus 300 includes a main board 310 for controlling the overall apparatus, a line connecting unit 322, a wireless LAN unit 308, the NFC unit 306, and the operation panel 305. Note that each of the line connecting unit 322, wireless LAN unit 308, and NFC unit 306 functions as a communication unit of the printing apparatus 300. Furthermore, the operation panel 305 is formed by a display, and a touch panel provided on the display surface of the display.

A CPU 311 in the form of a microprocessor arranged in the main board 310 operates according to control programs stored in a program memory 313 in the form of a ROM connected via an internal bus 312, and contents in a data memory 314 in the form of a RAM.

The CPU 311 controls a scanner unit 315 to read an original, and stores data in an image memory 316 of the data memory 314. The CPU 311 can control a printing unit 317 to print an image in the image memory 316 of the data memory 314 on a printing medium.

By controlling the wireless LAN unit 308 via a wireless LAN controller 318, the CPU 311 communicates with another communication terminal apparatus and the billing server via the wireless LAN 102. By controlling the NFC unit 306 via an NFC controller 319, the CPU 311 can detect a connection with another NFC terminal via the NFC 101, and transmit/receive data to/from the other NFC terminal. By controlling the line connecting unit 322 via a line controller 321, the CPU 311 can connect to a telephone line network 323, and perform FAX transmission/reception or data transmission/reception.

By controlling an operation panel controller 320, the CPU 311 can display the state of the printing apparatus 300 or a function selection menu on the operation panel 305, and accept an operation from the user.

FIG. 6 is a block diagram showing details of an NFC unit 600 used as the NFC unit 201 or 306.

In NFC communication, when the NFC unit 600 is used to perform short distance wireless communication, an apparatus which outputs an RF (Radio Frequency) field to start communication is called an initiator. An apparatus which communicates with the initiator in response to an instruction issued by the initiator is called a target.

A passive mode and active mode will now be described. The communication mode of the NFC unit includes a passive mode and active mode. In the passive mode, the target responds to an instruction of the initiator by performing load modulation. It is, therefore, unnecessary to supply power to the target. On the other hand, in the active mode, the target responds to an instruction of the initiator by an RF field generated by the target itself. It is, therefore, necessary to supply power to the target. The active mode has as its feature the communication speed higher than that in the passive mode.

The NFC unit 600 includes an NFC controller unit 601, an antenna unit 602, an RF unit 603, a transmitting/receiving control unit 604, an NFC memory 605, a power supply 606, and a device connecting unit 607. The antenna unit 602 receives radio waves and carriers from another NFC device, and transmits radio waves and carriers to another NFC device. The RF unit 603 has a function of modulating/demodulating an analog signal to a digital signal. The RF unit 603 includes a synthesizer, and controls bands and channels based on frequency assignment data by identifying the frequencies of the bands and channels.

Note that the NFC memory 605 is implemented by, for example, a nonvolatile memory. Even if the power supply supplies no power, it is possible to read/write data from/in the NFC memory 605. More specifically, data stored in the NFC memory 605 can be read/written by communication in the NFC passive mode, even if, for example, the remaining battery amount of the terminal apparatus 200 has run out or no power is supplied to the printing apparatus 300. The NFC controller unit 601 performs data storage control including an operation of reading/writing data from/in the NFC memory 605.

The transmitting/receiving control unit 604 executes control associated with transmission/reception, such as assembling and disassembling of a transmission/reception frame, appending and detection of a preamble, and identification of a frame. The transmitting/receiving control unit 604 also controls the NFC memory 605 to read/write various data and programs. When the NFC unit operates in the active mode, it receives power via the power supply 606 to communicate with a device via the device connecting unit 607 and to communicate with another NFC device located within a communicable range by carriers transmitted/received via the antenna unit 602. When the NFC unit operates in the passive mode, it receives carriers from another NFC device via the antenna to receive power from the other NFC device by electromagnetic induction, and transmits/receives data by performing communication with the other NFC device by modulating carriers. Therefore, when the NFC unit operates as a target in the passive mode, even if no power is supplied from the AC power supply, the battery, or the like, it is possible to transmit data stored in the memory of the NFC unit, and receive data from an external NFC unit.

An operation of moving the NFC unit 201 of the terminal apparatus 200 and the NFC unit 306 of the printing apparatus 300 close to each other will be referred to as an "NFC touch operation" hereinafter.

In this embodiment, a use case will be described, in which the user selects an image to be printed by operating the terminal apparatus 200, and then performs an NFC touch operation for the printing apparatus 300 for executing printing, thereby printing the selected image by the printing apparatus 300.

Figure 7A:
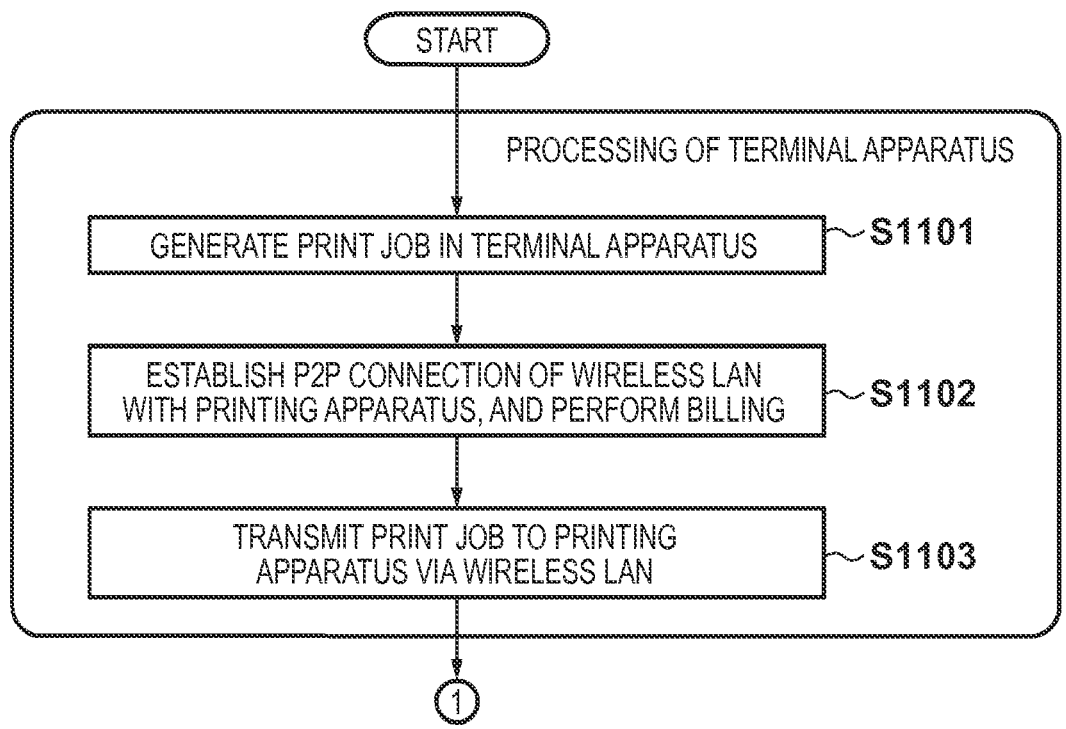

The embodiment will be described with reference to flowcharts shown in FIGS. 7A and 7B. FIGS. 7A and 7B show processing when the printing apparatus 300 prints an image designated by the terminal apparatus 200. FIG. 8 shows job setting values written in the NFC memory of the printing apparatus 300 from the terminal apparatus 200. The setting values of FIG. 8 show one embodiment of the present invention, and different information may be included or some of the setting values need not be included. FIG. 9 shows the piece of identification information of a plurality of printing apparatuses capable of executing billing processing, which are written in the NFC memory of the printing apparatus 300. The pieces of identification information of the plurality of printing apparatuses capable of executing billing processing will be referred to as an "identification information list" hereinafter. FIG. 10 shows the identification information of the printing apparatus itself, which is written in the NFC memory of the printing apparatus 300. The identifiers in FIGS. 9 and 10 show one embodiment of the present invention, and a different form may be used. FIG. 11 shows the remaining number of copies written in the NFC memory of the printing apparatus 300.

In step S1101, the terminal apparatus 200 selects image data in response to a user operation through the operation panel 204, and generates a print job by setting the number of copies. At this time, a plurality of image data may be selected. In step S1102, the terminal apparatus 200 establishes a P2P connection of a wireless LAN with the printing apparatus 300 in response to an NFC touch operation, and executes billing processing for the printing apparatus 300. As an example of a procedure of establishing a P2P connection of a wireless LAN by an NFC touch operation, firstly, the terminal apparatus 200 acquires communication parameters (an SSID, an encryption key, and the like) for a wireless LAN from the printing apparatus 300 by NFC communication. Secondly, the terminal apparatus 200 sets the wireless LAN unit 202 using the communication parameters. Note that the above procedure of establishing a P2P connection of a wireless LAN is merely an example, and another method may be used. In step S1103, the terminal apparatus 200 performs transmission processing of transmitting the job data generated in step S1101 to the printing apparatus 300. At the time of billing, the terminal apparatus 200 also transmits unique information for specifying and billing the terminal apparatus.

In step S1104, the printing apparatus 300 communicates with the billing server 800 to request the billing server 800 to execute billing processing, thereby executing billing processing. Assume that the billing processing executed here is collectively performed for print job data received by the printing apparatus 300. The printing apparatus 300 starts the print processing of the received print job.

In step S1105, the printing apparatus 300 writes job setting values (FIG. 8) from the received job data into the NFC memory (corresponding to the NFC memory 605 of FIG. 6)

of the NFC unit 306 of the printing apparatus 300. In step S1105, the printing apparatus 300 is executing printing.

In step S1106, the printing apparatus 300 communicates with the network connected to the billing server 800 to acquire the identification information list (FIG. 9). As for acquisition of the identification information, broadcast communication may be performed, and identification information may be acquired from an apparatus which has responded. Alternatively, the identification information of a printing apparatus may be acquired from the billing server 800 by issuing a request to the billing server 800.

In step S1107, the pieces of identification information of the plurality of printing apparatuses acquired in step S1106 and the identification information (FIG. 10) of the printing apparatus 300 are written in the NFC memory. The identification information of the printing apparatus 300 may be written in the NFC memory in advance.

In step S1108, every time the processing unit of the job is completed (in this embodiment, every time printing of one paper sheet is completed), the printing apparatus 300 writes and updates the progress information of the job (the remaining number of pages or copies (FIG. 11)) in the NFC memory of the printing apparatus 300. When the remaining number of copies of a managed image ID in FIG. 11 becomes 0, the remaining number of copies of the image ID may be deleted from the NFC memory of the printing apparatus 300. Note that the information written in the NFC memory in step S1108 is not limited to the remaining number of pages or copies, and may include the page number of a page having been printed, or the page number of a page to be printed next.

In step S1109, the printing apparatus 300 confirms whether the identification information list has been successfully acquired in step S1106. If the acquisition processing has failed, the processes in steps S1106 to S1108 are repeated until the identification information list can be acquired.

In step S1110, the printing apparatus 300 determines whether printing has normally ended. If printing has normally ended (YES in step S1110), in step S1111 the printing apparatus 300 deletes the job setting values, the identification information list, the identification information of the printing apparatus 300, and the remaining number of copies, which have been written in the NFC memory of the printing apparatus 300. At this time, it is not necessary to delete the identification information of the printing apparatus 300.

On the other hand, if printing has not ended normally (NO in step S1110), in step S1112 the printing apparatus 300 confirms whether it is impossible to continue printing. Note that a case in which NO (printing has not ended normally) is determined in step S1110 includes a case in which not all pages to be printed corresponding to the print job have been printed or not all copies have been printed, and a case in which it is impossible to continue printing due to various errors. If it is possible to continue printing (NO in step S1112), the processes in steps S1108 to S1110 are repeated until printing ends normally. If it is impossible to continue printing due to an error or the like (YES in step S1112), the printing apparatus 300 writes and updates the remaining number of copies in the NFC memory of the printing apparatus 300 in step S1113. Note that the remaining number of copies may be written in the NFC memory at the time of occurrence of the error during the print processing (a series of processes for each page).

Note that the error indicates an error from which printing by the printing apparatus 300 cannot immediately recover, for example, a malfunction of the printing unit and a failure of the printing apparatus 300 (power supply failure, part failure, and the like). However, the error is not limited to them, and may indicate any error which disables printing from normally ending (for example, printing material shortage such as ink shortage or tonner shortage, paper out, and paper jam). At the time of occurrence of such error, the printing apparatus 300 may be powered off, or the printing apparatus 300 may be kept ON but cannot execute printing.

As described above, according to the first embodiment, the printing apparatus 300 stores the setting values of the job which executes printing, the identification information list, and the identification information of the printing apparatus 300 in the NFC memory of the NFC unit 306 of the printing apparatus 300 itself during print processing based on the print job. More specifically, every time one paper sheet is printed, the remaining number of copies is saved as printing progress information in the NFC memory of the NFC unit 306. By using the NFC unit 201, the terminal apparatus 200 can refer to or read out the job setting values, the identification information list, the identification information of the printing apparatus 300, and the remaining number of copies, which have been saved in the NFC memory of the printing apparatus 300. With this processing, even if the printing apparatus 300 cannot continue printing due to a failure or the like (the printing apparatus 300 stops due to an error), the user of the terminal apparatus 200 can perform NFC communication between the terminal apparatus 200 and the printing apparatus 300 used as a job transmission destination to acquire the information stored in the NFC memory of the NFC unit 306 of the printing apparatus 300, that is, information about billing, information indicating how much the print job is complete (the remaining number of paper sheets corresponding to the incomplete portion of the print job), and the identification information of the alternative printing apparatus 700. Therefore, the user can cause the alternative printing apparatus 700 to continue printing of the incomplete portion of the print job by connecting the terminal apparatus 200 to the alternative printing apparatus 700 to transmit the print job and the acquired information to the alternative printing apparatus 700. Furthermore, since the billing information is also taken over, the user is not billed additionally. Note that details of this point will be described below in the second embodiment.

Note that in the flowcharts shown in FIGS. 7A and 7B, either the terminal apparatus or printing apparatus may serve as an initiator to perform NFC communication. At the time of transmitting a print job by the terminal apparatus, the terminal apparatus may serve as an initiator to send a print request to the printing apparatus, and the printing apparatus may serve as an initiator when the terminal apparatus transmits data to be printed.

Furthermore, as described above, the NFC unit serving as a target in the NFC passive mode can perform NFC communication even if the AC power supply or battery supplies no power to the NFC unit. Therefore, when the NFC unit of the printing apparatus operates as a target in the passive mode in communication of FIGS. 7A and 7B, even if an error which turns off the power of the printing apparatus during printing occurs, the terminal apparatus can read out the information (the setting values, progress information, billing information, various kinds of identification information, and the like) written in the memory of the NFC unit.

Furthermore, in the sequence shown in FIGS. 7A and 7B, there are a case in which the NFC unit of the printing apparatus serves as an initiator to perform communication, a case in which an error which turns off the power of the printing apparatus has occurred, and a case in which the NFC unit cannot operate as an initiator. In these cases, the NFC unit may operate as a target.

[Second Embodiment]

In this embodiment, the job setting values of FIG. 8, the identification information list of FIG. 9, the identification information of a printing apparatus 300 of FIG. 10, and the remaining number of pages and/or the remaining number of copies of FIG. 11, which have been saved in the NFC memory of the printing apparatus 300, are used. A use case in which a printing apparatus 700 (alternative printing apparatus) executes printing will be described. The printing apparatuses 300 and 700 may be the same or different.

Note that the arrangement of each apparatus according to this embodiment is the same as that according to the first embodiment, unless otherwise specified, and a description thereof will be omitted. The outer appearance of the printing apparatus 700 is the same as that shown in FIGS. 3A and 3B and its arrangement is the same as that shown in FIG. 5.

Figure 12:
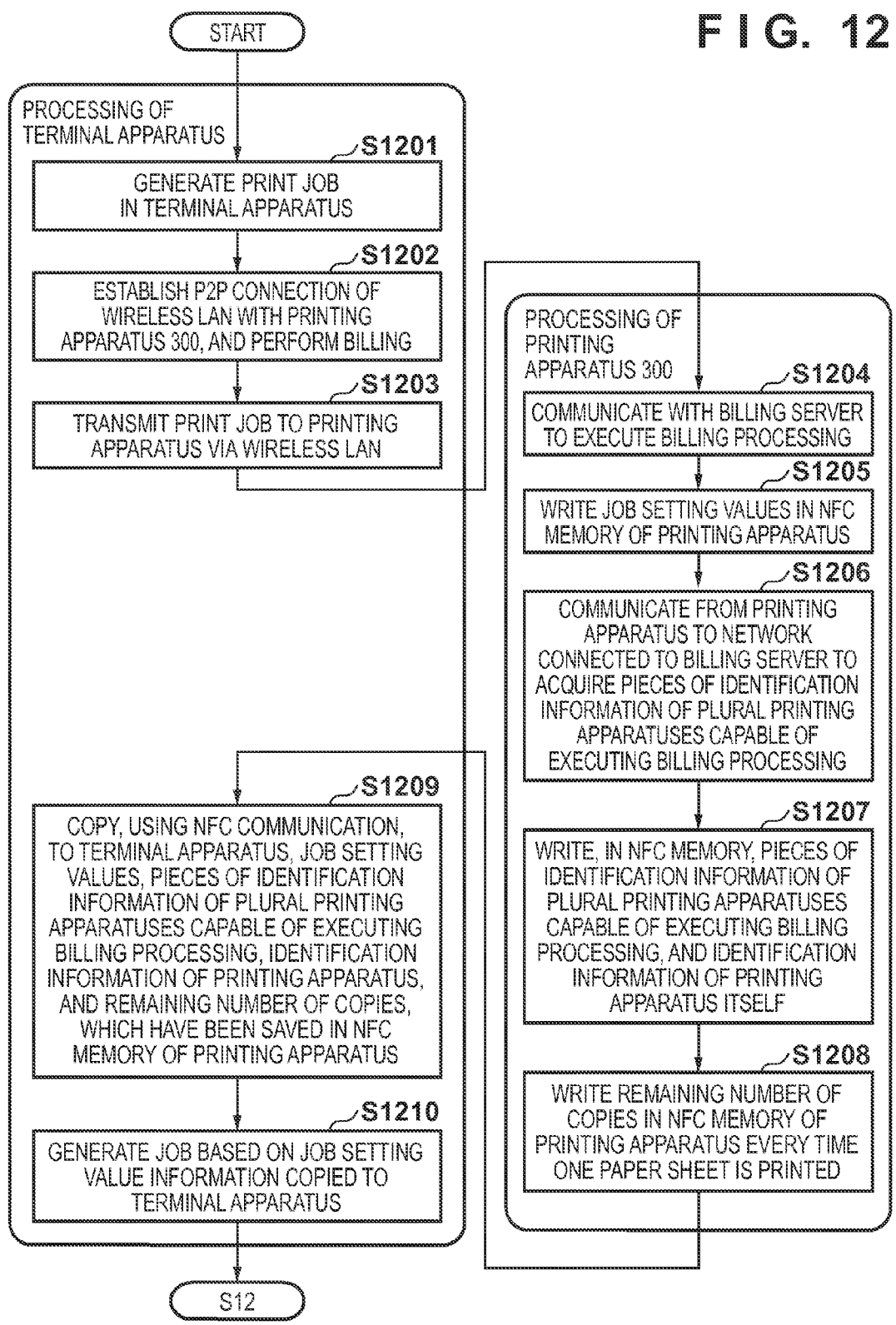
FIG. 12 is a flowchart illustrating processing contents according to the second embodiment.
Figure 13:
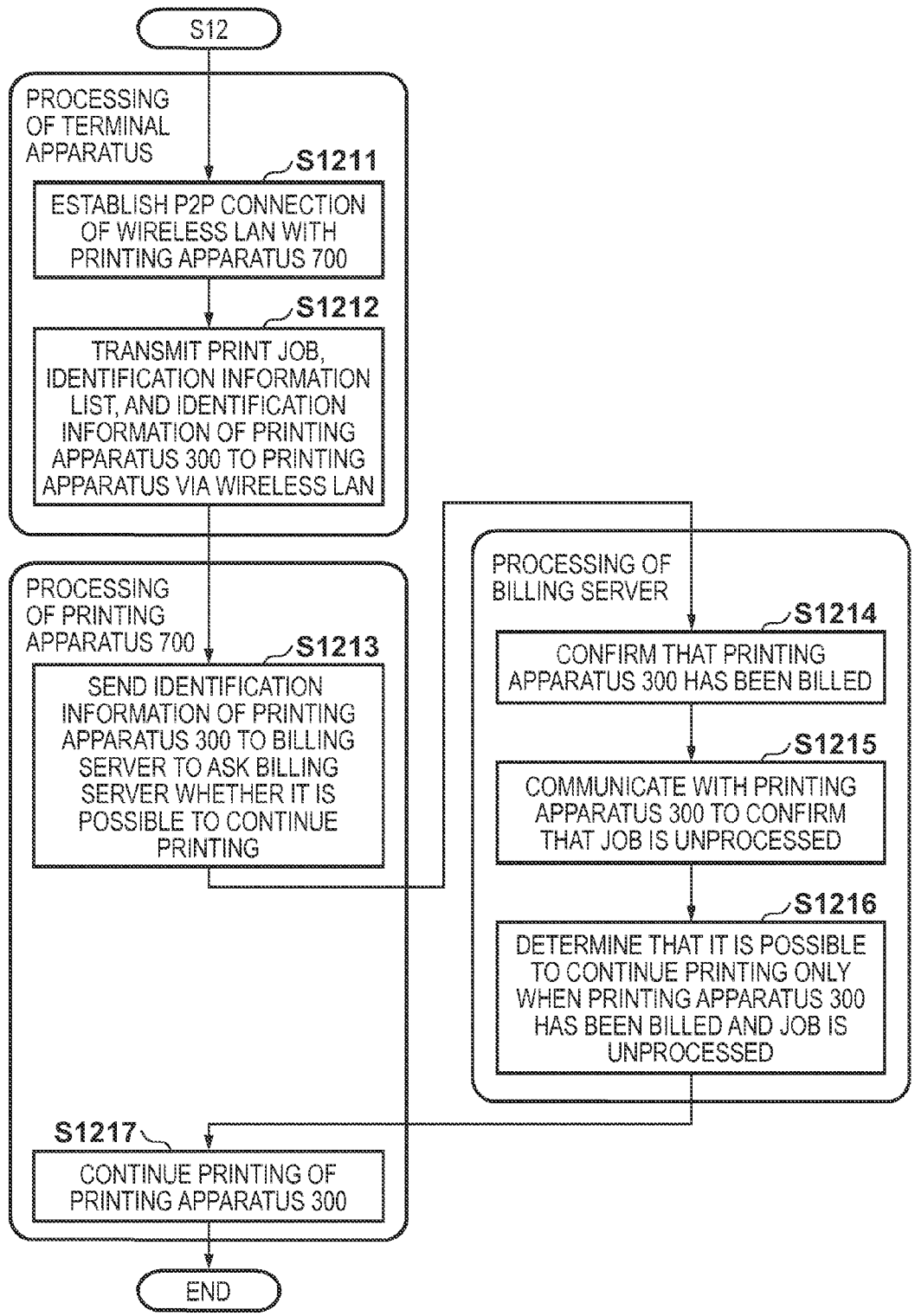
FIG. 13 is a flowchart illustrating the processing contents according to the second embodiment.

This embodiment will be explained with reference to flowcharts shown in FIGS. 12 and 13. Note that processes in steps S1201 to S1208 are the same as those in steps S1101 to S1108 of FIGS. 7A and 7B and a description thereof will be omitted.

Assume that after execution of the processing in step S1208, a failure which disables the printing apparatus 300 from being powered on occurs. In step S1209, a terminal apparatus 200 reads out the job setting values (FIG. 8), the identification information list (FIG. 9), the identification information of the printing apparatus 300 (FIG. 10), and the remaining number of pages and/or the remaining number of copies (FIG. 11), which have been saved in the NFC memory of the printing apparatus 300. Even if the printing apparatus 300 cannot be powered on due to the failure, it is possible to read out the information saved in the NFC memory of the printing apparatus 300 using the NFC passive mode. The terminal apparatus 200 saves, in a data memory 214, the job setting values, the identification information list, the identification information of the printing apparatus 300, and the remaining number of copies, which have been read out.

In step S1210, the terminal apparatus 200 generates a job based on the job setting values and the remaining number of copies, which have been saved in the data memory 214. In step S1211 (FIG. 13), the terminal apparatus 200 establishes a P2P connection of a wireless LAN with the printing apparatus 700 in response to an NFC touch operation. Note that the terminal apparatus 200 may establish a P2P connection of a wireless LAN by a method other than the NFC touch operation. An application installed in the terminal apparatus 200 may be used to search for the printing apparatus 700 belonging to the same billing system as that of the printing apparatus 300 using the identification information list saved in the data memory 214. The terminal apparatus 200 and the printing apparatus 700 can establish a wireless LAN connection irrespective of the network arrangement of the printing apparatus 300. In step S1212, the terminal apparatus 200 transmits the identification information list, the identification information of the printing apparatus 300, and the job generated based on the job setting values and remaining number of copies to the printing apparatus 700 via the wireless LAN.

Upon receiving a reprint job (continued print job) from the terminal apparatus, in step S1213 the printing apparatus 700 sends the identification information of the printing apparatus 300 to a billing server 800 to ask the billing server 800 whether it is possible to continue printing executed by the printing apparatus 300. In step S1214, based on the identification information of the printing apparatus 300, the billing server 800 confirms that the printing apparatus 300 has been billed. In step S1215, the billing server 800 communicates with the printing apparatus 300 based on the identification information of the printing apparatus 300, and confirms that the job processing executed by the printing apparatus 300 is unprocessed. Note that based on the remaining number of pages and/or the remaining number of copies saved in the NFC memory of the printing apparatus 300, the billing server 800 may determine that the job processing executed by the printing apparatus 300 is unprocessed. Alternatively, if the billing server 800 cannot communicate with the printing apparatus 300, it may determine that the job processing executed by the printing apparatus 300 is unprocessed. If the billing server 800 can confirm that the printing apparatus 300 has been billed and the job is unprocessed, it determines in step S1216 that printing may be continued, and returns the determination result to the printing apparatus 700. If the billing server 800 returns, in step S1216, the determination result indicating that printing may be continued, the printing apparatus 700 executes the print processing of the remaining number of copies in step S1217.

As described above, according to the second embodiment, the printing apparatus 300 saves, in the NFC memory, the setting values of the job which executes printing, the identification information list, the identification information of the printing apparatus 300, and the remaining number of pages and/or the remaining number of copies. The terminal apparatus 200 refers to the job setting values, the identification information list, the identification information of the printing apparatus 300, and the remaining number of copies, which have been saved in the NFC memory of the printing apparatus 300, and transmits them to the printing apparatus 700. The printing apparatus 700 communicates with the billing server 800 to confirm whether the printing apparatus 700 can continue printing executed by the printing apparatus 300. With this processing, even if the printing apparatus 300 cannot continue printing due to a failure or the like, it is possible to continue printing using the printing apparatus 700 different from the printing apparatus 300 without further billing the user.

Note that when the terminal apparatus 200 prints a plurality of copies of a plurality of pages, the printing apparatus 300 may store, in the NFC memory, information indicating the printing order, that is, whether to execute printing for each copy or to print the plurality of copies for each page. For example, when the terminal apparatus 200 prints 10 copies of data of 10 pages, the above information includes the printing order indicating that an operation of printing one copy of the first to 10th pages is repeated 10 times (for example, printing order A), or that an operation of printing the first page is repeated 10 times and then an operation of printing the second page is repeated 10 times (for example, printing order B). In the former case, if printing is interrupted when printing the fifth page of the fourth copy, the terminal apparatus can acquire information indicating "printing order A", "remaining number of pages: 6", and "remaining number of copies: 7".

When the printing apparatus 700 receives the information, it can start printing from the fifth page of the fourth copy, and execute printing of the first to 10th pages of the fifth to 10th copies.

Note that progress information written in the NFC memory by the printing apparatus 300 is not limited to the remaining number of pages and/or the remaining number of copies. Even if the printing apparatus 300 writes, for example, the page number and/or copy number being printed (or having been printed), it is possible to obtain the same effects as those in the above processing.

Furthermore, by using various methods, the terminal apparatus can notify the printing apparatus 700 that the print job is continued printing.

For example, the user may designate continued printing by operating the operation panel of the terminal apparatus, or the printing apparatus 700 may be automatically notified of continued printing. As an automatic notification method, for example, at the start of printing in the printing apparatus 300, information indicating "printing in progress" is stored in the NFC memory of the printing apparatus 300. Upon completion of the print processing, the information is deleted.

If an error occurs, the information remains in the NFC memory, and thus the communication apparatus can read out the information. When a print job is transmitted to the printing apparatus 700, the printing apparatus 700 determines the presence/absence of the information. If the printing apparatus 700 receives the information, it may determine that the print job is continued printing.

[Third Embodiment]

In this embodiment, the job setting values of FIG. 8, the identification information list of FIG. 9, the identification information of a printing apparatus 300 of FIG. 10, and the remaining number of copies of FIG. 11, which have been saved in the NFC memory of the printing apparatus 300 are used. A use case in which a printing apparatus 700 (alternative printing apparatus) is used to continue an incomplete job will be described. The printing apparatuses 300 and 700 may be the same or different.

Note that the arrangement of each apparatus according to this embodiment is the same as that according to the first and second embodiments, unless otherwise specified, and a description thereof will be omitted. The outer appearance of the printing apparatus 700 is the same as that shown in FIGS. 3A and 3B and its arrangement is the same as that shown in FIG. 5.

Figure 14:
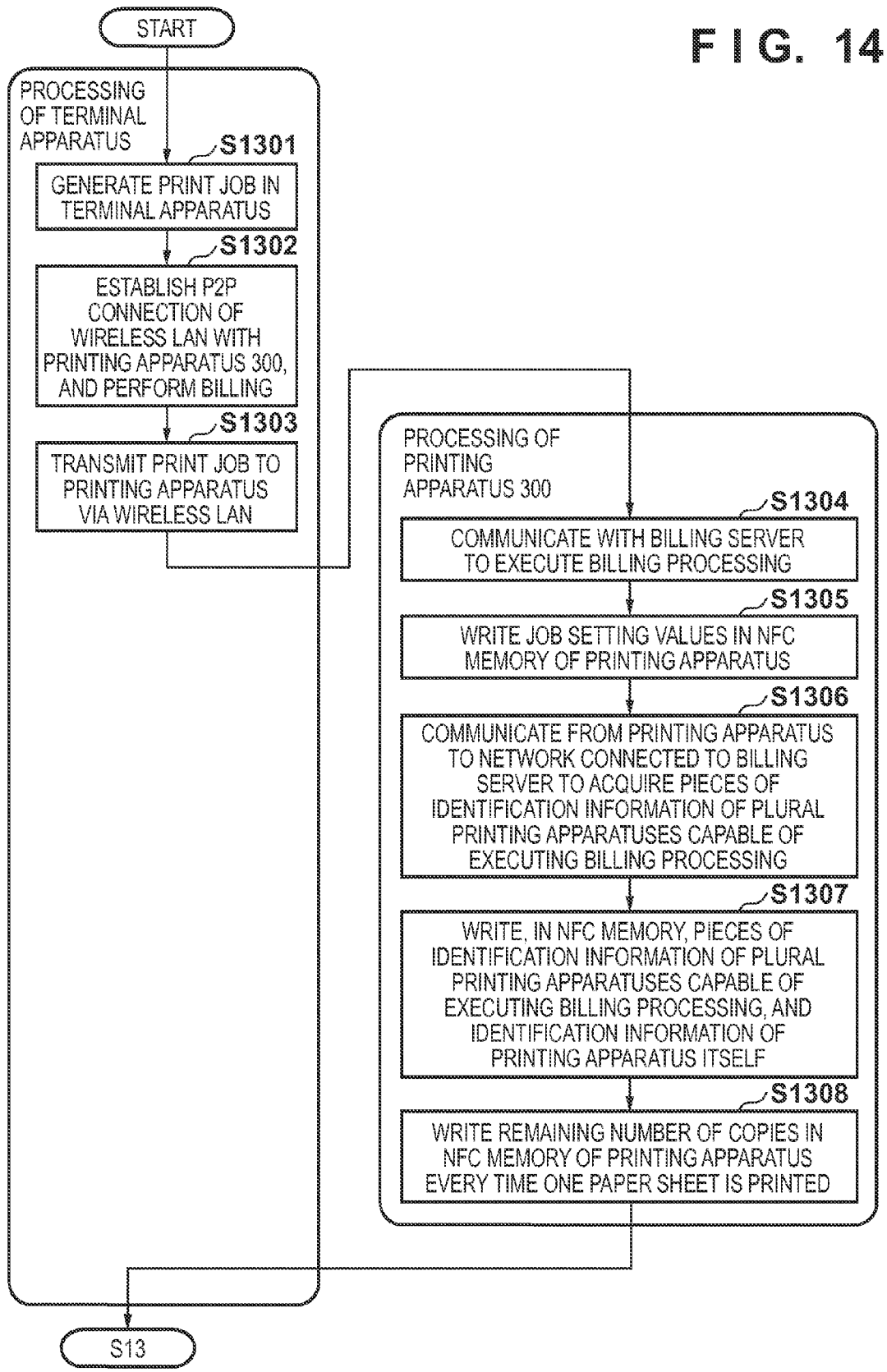
FIG. 14 is a flowchart illustrating processing contents according to the third embodiment.
Figure 15:
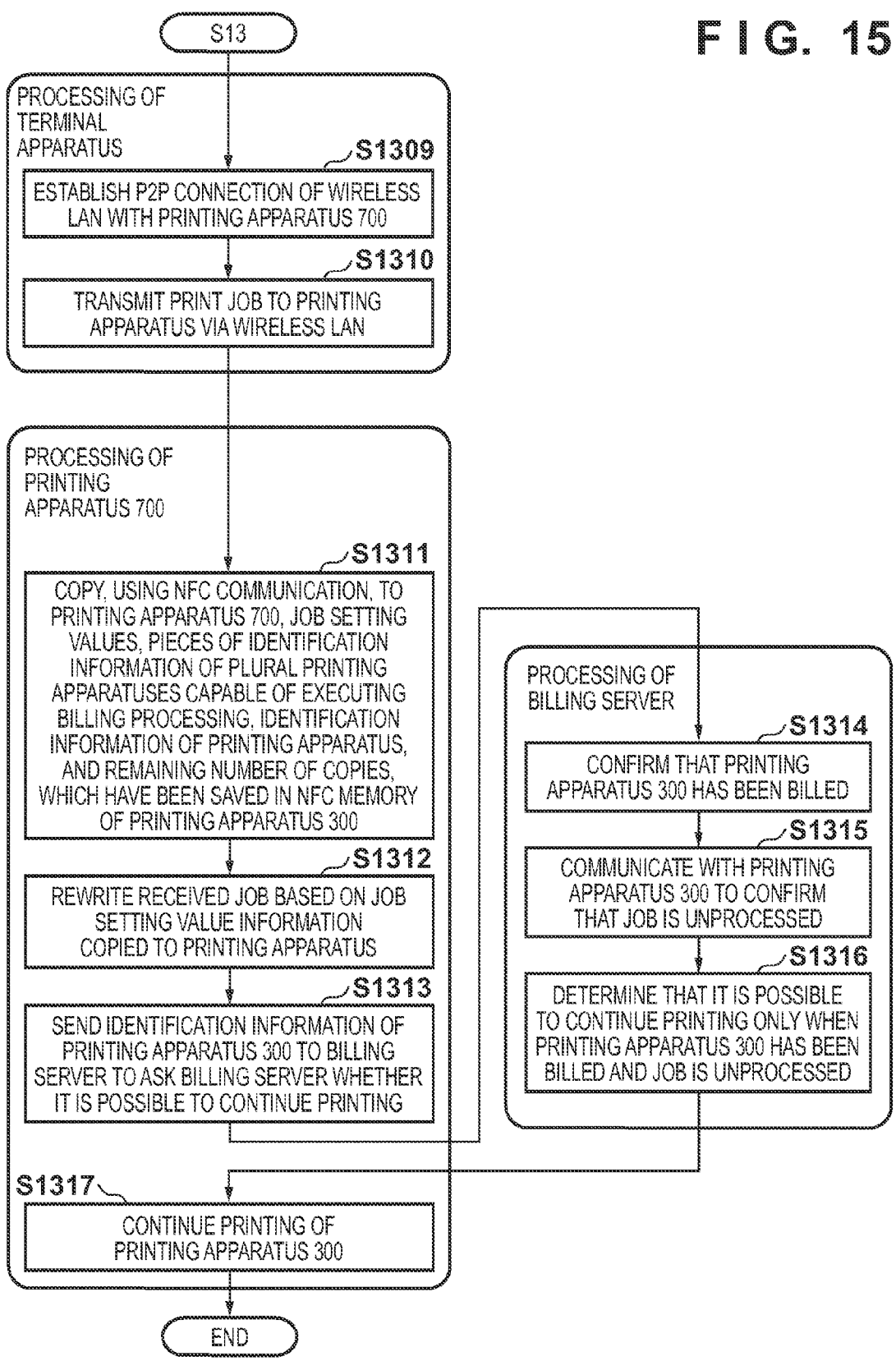
FIG. 15 is a flowchart illustrating the processing contents according to the third embodiment.

This embodiment will be explained with reference to flowcharts shown in FIGS. 14 and 15. Note that processes in steps S1301 to S1308 are the same as those in steps S1101 to S1108 of FIGS. 7A and 7B and a description thereof will be omitted. Processing in step S1309 is the same as that in step S1211 of FIG. 13 and a description thereof will be omitted. Also, processes in steps S1313 to S1317 are the same as those in steps S1213 to S1217 of FIG. 13 and a description thereof will be omitted.

In step S1310, a terminal apparatus 200 transmits, to the printing apparatus 700, completely the same job as that transmitted to the printing apparatus 300. In step S1311, the printing apparatus 700 communicates with the NFC unit of the printing apparatus 300 using NFC communication, and reads out the job setting values (FIG. 8), the identification information list (FIG. 9), the identification information of the printing apparatus 300 (FIG. 10), and the remaining number of copies (FIG. 11), which have been saved in the NFC memory of the printing apparatus 300. Even if the printing apparatus 300 cannot be powered on due to a failure, the terminal apparatus 200 can read out the information saved in the NFC memory using the NFC passive mode. In step S1312, the printing apparatus 700 rewrites the received job based on the received job, and the job setting values and the remaining number of pages and/or the remaining number of copies, which have been read out in step S1311.

If, for example, an error has occurred in the printing apparatus 300, the user can continue the same printing operation as that executed by the printing apparatus 300 before the occurrence of the error from the point of the printing operation at which the error has occurred, by moving the NFC unit of the printing apparatus 300 closer to that of the printing apparatus 700 without intervention of the terminal apparatus 200. If, for example, the printing apparatus 300 is a compact mobile printer or the like, the user can readily carry the printing apparatus 300, thereby enabling the printing apparatuses 300 and 700 to execute direct NFC communication.

The above example will be clearly explained below. For example, consider a case in which the terminal apparatus 200 requests the printing apparatus 300 to print 100 copies, and then some error occurs in the printing apparatus 300 upon completion of printing of 60 copies. In this case, the terminal apparatus 200 acquires, from the printing apparatus 300 via the NFC unit, information including information indicating 40 copies corresponding to an incomplete processing amount, which is necessary for continued printing. The terminal apparatus 200 transmits, to the printing apparatus 700, the same print job (a print job of 100 copies) as that transmitted to the printing apparatus 300, and also transmits the information acquired from the printing apparatus 300 via the NFC unit to the printing apparatus 700. This proves that billing for the received job has already been performed, and printing of 40 copies is incomplete, the printing apparatus 700 rewrites "100 copies" in the NFC memory of the NFC unit of itself by "40 copies". That is, the printing apparatus 700 reconfigures the progress state of the job in the NFC memory of the NFC unit of the printing apparatus 300 immediately before a failure of the printing apparatus 300 occurs. The printing apparatus 700 continuously executes the job.

As described above, according to the third embodiment, the printing apparatus 300 saves, in the NFC memory, the setting values of the job which executes printing, the identification information list, the identification information of the printing apparatus 300, and the remaining number of copies. The printing apparatus 700 rewrites the job by referring to the job setting values, the identification information list, the identification information of the printing apparatus 300, and the remaining number of copies, which have been saved in the NFC memory of the printing apparatus 300. The printing apparatus 700 communicates with a billing server 800 to confirm whether the printing apparatus 700 can continue printing executed by the printing apparatus 300. With this processing, even if the printing apparatus 300 cannot continue printing due to a failure or the like, it is possible to continue printing using the printing apparatus 700 different from the printing apparatus 300 without further billing the terminal apparatus 200.

[Fourth Embodiment]

In this embodiment, the job setting values of FIG. 8, the identification information list of FIG. 9, the identification information of a printing apparatus 300 of FIG. 10, and the remaining number of copies of FIG. 11, which have been saved in the NFC memory of the printing apparatus 300 are used. A use case in which a printing apparatus 700 is used to cancel billing for an unprocessed job will be described.

Note that the arrangement of each apparatus according to this embodiment is the same as that according to the first, second, and third embodiments, unless otherwise specified, and a description thereof will be omitted. The outer appearance of the printing apparatus 700 is the same as that shown in FIGS. 3A and 3B and its arrangement is the same as that shown in FIG. 5.

Figure 16:
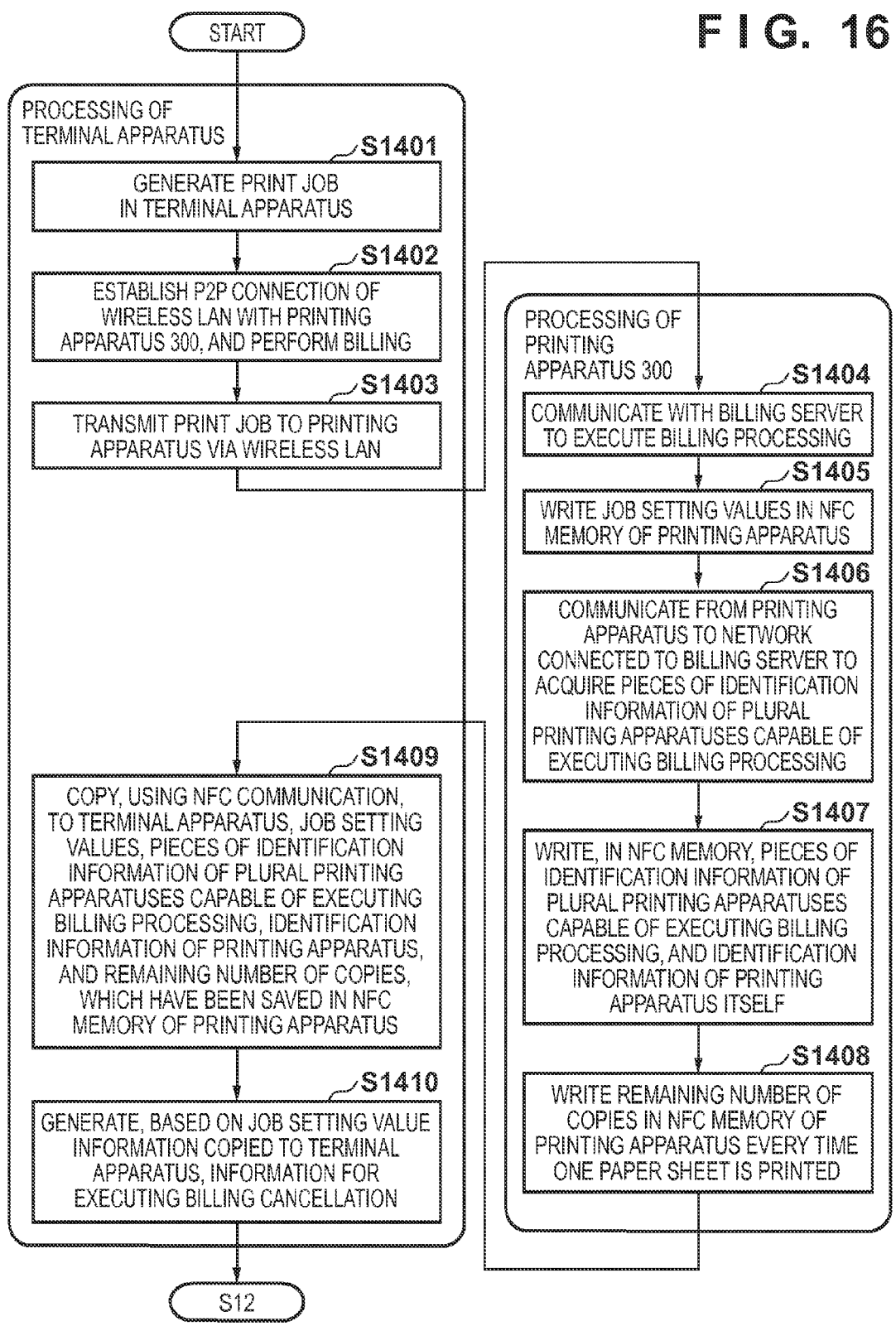
FIG. 16 is a flowchart illustrating processing contents according to the fourth embodiment.
Figure 17:
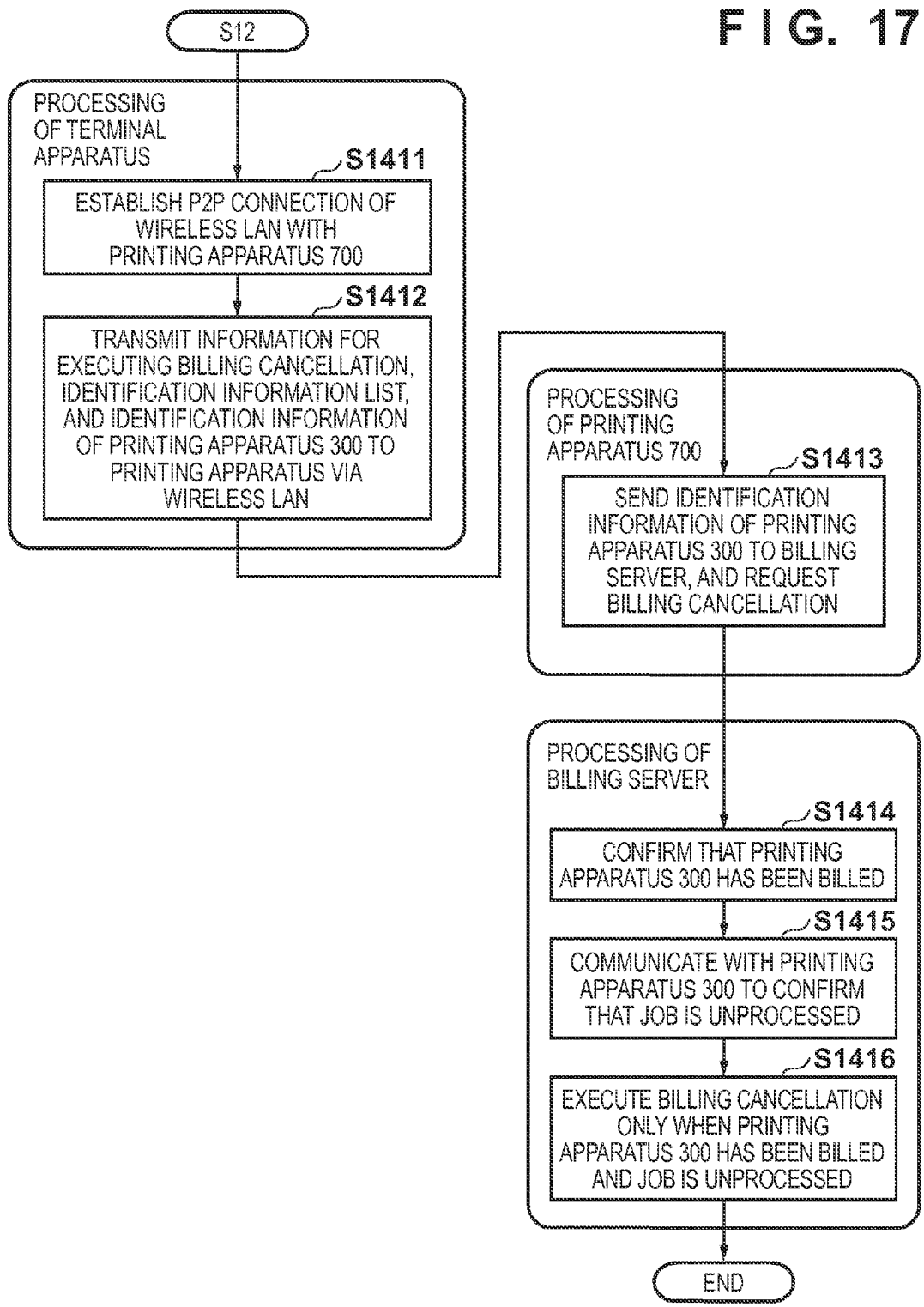
FIG. 17 is a flowchart illustrating the processing contents according to the fourth embodiment.

This embodiment will be explained with reference to flowcharts shown in FIGS. 16 and 17. Note that processes in steps S1401 to S1409 are the same as those in steps S1201 to S1209 of FIG. 12 and a description thereof will be omitted. Processing in step S1411 is the same as that in step S1211 of FIG. 13 and a description thereof will be omitted. Also, processes in steps S1414 and S1415 are the same as those in steps S1214 and S1215 of FIG. 13 and a description thereof will be omitted.

In step S1410, based on the job setting values and the remaining number of copies, which have been saved in a data memory 214, a terminal apparatus 200 generates information for executing billing cancellation for an unprocessed job. The information for executing billing cancellation for an unprocessed job will be referred to as "billing cancellation information" hereinafter.

In step S1412, the terminal apparatus 200 transmits the billing cancellation information, the identification information list, and the identification information of the printing apparatus 300 to the printing apparatus 700.

Upon receiving the billing cancellation information from the terminal apparatus, in step S1413 the printing apparatus 700 requests a billing server 800 to cancel billing for the job unprocessed by the printing apparatus 300 by sending the identification information of the printing apparatus 300 to the billing server 800.

In step S1416, when the billing server 800 can confirm that the printing apparatus 300 has been billed and the job is unprocessed, it executes billing cancellation for the job unprocessed by the printing apparatus 300.

As described above, according to the fourth embodiment, the printing apparatus 300 saves, in the NFC memory, the setting values of the job which executes printing, the identification information list, the identification information of the printing apparatus 300, and the remaining number of pages and/or the remaining number of copies. The terminal apparatus 200 refers to the job setting values, the identification information list, the identification information of the printing apparatus 300, and the remaining number of copies, which have been saved in the NFC memory of the printing apparatus 300, and transmits them to the printing apparatus 700. The printing apparatus 700 communicates with the billing server 800, and executes billing cancellation for the job unprocessed by the printing apparatus 300. With this processing, even if the printing apparatus 300 cannot continue printing due to a failure or the like, it is possible to cancel billing for the unprocessed job.

Note that a case in which when a failure of the printing apparatus 300 occurs, the alternative printing apparatus 700 continues an incomplete job has been explained in the above embodiments, and vice versa. That is, it should be understood that the processes described as those executed by the printing apparatus 700 are also executed by the printing apparatus 300.

In the above embodiments, various kinds of information such as printing setting values and progress information in the printing apparatus 300 are written in the NFC memory which is accessible by the terminal apparatus even when no power is supplied to the printing apparatus 300. Therefore, even if an error which turns off the power of the printing apparatus 300 has occurred, the terminal apparatus can continue the same printing operation as that executed by the printing apparatus 300 from the point of the printing operation at which the error has occurred, by reading out the information from the NFC memory, and causing the other printing apparatus 700 to execute printing.

Note that a case in which billing is performed before execution of printing has been mainly described in the above embodiments. The present invention, however, is not limited to this, and is applicable to a case in which billing is performed every time one page or one copy is printed. When the printing apparatus 700 different from the printing apparatus 300 in which an error has occurred is used to perform continued printing, the number of pages and/or the number of copies for which billing has not been performed are specified based on the remaining number of pages and/or the remaining number of copies. The printing apparatus 700 communicates with the billing server according to the specified number of pages and/or the specified number of copies, thereby enabling appropriate billing for printing executed by the printing apparatus 700.

Note that printing by the printing apparatus 300 has been exemplified as an example of a job executed by the printing apparatus 300 in the above embodiments. Processing corresponding to a job is not limited to this. For example, processing of transmitting data (for example, a read image obtained by reading an original by the printing apparatus 300, or a document, an image, or the like stored in the memory of the printing apparatus 300) from the printing apparatus 300 to the terminal apparatus 200 may be executed. More specifically, if the terminal apparatus 200 requests the printing apparatus 300 to transmit the above-described data as a job, the printing apparatus 300 transmits the above-described various data to the terminal apparatus 200 in response to the request. Examples of the processing corresponding to the job are processing in which the printing apparatus 300 stores data received from the terminal apparatus 200 in an internal or external memory, and processing in which the printing apparatus 300 transmits the data to an external apparatus (for example, a server on the network).

The communication terminal may transmit a print job to the printing apparatus via the wireless LAN, or transmit a print job by NFC.

[Industrial Applicability]

The present invention is usable in a wireless communication apparatus and wireless communication system and, more particularly, in an apparatus which can perform short distance wireless communication, establishment of a peer-to-peer connection between such apparatuses, and a wireless communication system of these apparatuses.

(Other Embodiments)

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159715, filed Jul. 31, 2013, which is hereby incorporated by reference herein in its entirety.

What is claimed is:

1. A system for executing a job, comprising:
   a first processing apparatus configured to receive a job from an external apparatus, to execute processing corresponding to the job and to perform billing processing for the job; and
   a second processing apparatus configured to receive a job from an external apparatus, to execute processing corresponding to the job and to perform billing processing for the job;
   wherein the first processing apparatus executes processing corresponding to the received job, and writes, in a memory which is accessible by the external apparatus even when no power is supplied to said first processing apparatus, at least one of a setting value about the job and progress information of the processing,
   wherein the second processing apparatus receives the job, at least one of the setting value and the progress information, and information for determining whether billing for the job has already been performed, and
   wherein, if the second processing apparatus determines based on the information, that the billing has been performed, the second processing apparatus executes processing corresponding to the job based on at least one of the setting value and the progress information, without further performing billing processing.

2. The system according to claim 1, wherein said first processing apparatus further writes identification information of said first processing apparatus in the memory, and said second processing apparatus receives the identification information and determines whether the billing has already been performed based on the identification information.

3. The system according to claim 2,
   wherein the first processing apparatus further writes identification information of the second processing apparatus, and the second processing apparatus executes the determination based on the identification information of the second processing apparatus.

4. The system according to claim 3, wherein said first processing apparatus acquires the identification information of the second processing apparatus every time a processing unit of the job is executed.

5. The system according to claim 2, wherein if the second processing apparatus receives the job and identification information of the first processing apparatus, the second processing apparatus transmits the identification information of the first apparatus to determine whether the billing has already been performed.

6. The system according to claim 2, wherein the second processing apparatus receives a job, and an NFC unit receives identification information of the first processing apparatus and progress information obtained when the received job is incomplete, the second processing apparatus transmits the identification information of the first processing apparatus to determine whether the billing has already been performed and, if the billing has been performed, executes the received job without further performing billing processing after rewriting the job according to the progress information.

7. The system according to claim 1, wherein if the processing corresponding to the job normally ends, the first processing apparatus deletes the setting value and the progress information, which have been stored in the memory.

8. The system according to claim 1, wherein the first processing apparatus writes and updates the progress information in the memory at the time of occurrence of an error during processing of the job.

9. The system according to claim 1, wherein the job is a print job and each of the first processing apparatus and the second processing apparatus is a printer.

10. The system according to claim 1,
    wherein the first processing apparatus comprises an NFC unit configured to perform NFC communication,
    and performs the writing operation in a memory of said NFC unit.

11. The system according to claim 10, wherein the external device includes an NFC unit and a communication unit communicable with the first processing apparatus and the second processing apparatus,
    and wherein the external device transmits a job to the first processing apparatus via said communication unit, and if the first processing apparatus stops due to an error after transmission by the transmission processing, acquires the progress information via said NFC unit, and
    transmits an incomplete portion of the job to the second processing apparatus according to the acquired progress information.

12. The system according to claim 11, wherein said NFC unit of the external apparatus receives communication information for communicating with the first processing apparatus via a wireless LAN, from the NFC unit of the first processing apparatus, and said communication unit of the external apparatus communicates with the first processing apparatus via the wireless LAN using the received communication information.

13. A system for executing a job, comprising:
    a first processing apparatus configured to receive a job from an external apparatus, to execute processing corresponding to the job and to perform billing processing for the job; and
    a second processing apparatus configured to receive a job from an external apparatus, to execute processing corresponding to the job and to perform billing processing for the job;
    wherein the first processing apparatus executes processing corresponding to the received job, and writes, in a memory which is accessible by the external apparatus even when no power is supplied to said processing apparatus, at least one of a setting value about the job and progress information of the processing, and
    wherein if said second processing apparatus receives a billing cancellation request issued based on at least one of the setting value and the progress information, said second processing apparatus determines whether billing for the received job has already been performed, and cancels billing.

14. The system according to claim 13, wherein the job is a print job and each of the first processing apparatus and the second processing apparatus is a printer.

15. The system according to claim 13, wherein the first processing apparatus comprises an NFC unit configured to perform NFC communication, and performs the writing operation in a memory of said NFC unit.

16. The system according to claim 15, wherein the external device includes an NFC unit and a communication unit communicable with the first processing apparatus and the second processing apparatus,
    and wherein the external device transmits a job to the first processing apparatus via said communication unit, and if the first processing apparatus stops due to an error after transmission by the transmission processing, acquires the progress information via said NFC unit, and transmits an incomplete portion of the job to the second processing apparatus according to the acquired progress information.

17. The system according to claim 16, wherein said NFC unit of the external apparatus receives communication information for communicating with the first processing apparatus via a wireless LAN, from the NFC unit of the first processing apparatus, and said communication unit of the external apparatus communicates with the first processing apparatus via the wireless LAN using the received communication information.

18. A method of controlling a system comprising a first processing apparatus having a first processor and a second processing apparatus having a second processor, said method comprising the steps of:

in the first processing apparatus, receiving a job from an external apparatus, executing processing corresponding to the job and performing billing processing for the job, wherein the receiving, the executing, and the performing are executed by the first processor; and in the second processing apparatus, receiving a job from an external apparatus, executing processing corresponding to the job and performing billing processing for the job, wherein the receiving, the executing, and the performing are executed by the second processor;

wherein the first processing apparatus executes, by the first processor, processing corresponding to the received job, and writes, by the first processor, in a memory which is accessible by the external apparatus even when no power is supplied to said first processing apparatus, at least one of a setting value about the job and progress information of the processing, wherein the second processing apparatus receives, by the second processor, the job, at least one of the setting value and the progress information, and information for determining whether billing for the job has already been performed, and wherein, if the second processing apparatus determines by the second processor based on the information, that the billing has been performed, the second processing apparatus executes, by the second processor, processing corresponding to the job based on at least one of the setting value and the progress information, without further performing billing processing.

19. A method of controlling a system comprising a first processing apparatus having a first processor and a second processing apparatus having a second processor, said method comprising the steps of:

in the first processing apparatus, receiving a job from an external apparatus, executing processing corresponding to the job and performing billing processing for the job, wherein the receiving, the executing, and the performing are executed by the first processor; and in the second processing apparatus, receiving a job from an external apparatus, executing processing corresponding to the job and performing billing processing for the job, wherein the receiving, the executing, and the performing are executed by the second processor;

wherein the first processing apparatus executes, by the first processor, processing corresponding to the received job, and writes, by the first processor, in a memory which is accessible by the external apparatus even when no power is supplied to said processing apparatus, at least one of a setting value about the job and progress information of the processing, and wherein if said second processing apparatus receives, by the second processor, a billing cancellation request issued based on at least one of the setting value and the progress information, said second processing apparatus determines whether billing for the received job has already been performed, and cancels billing.

* * * * *